Patented May 5, 1936

2,039,555

UNITED STATES PATENT OFFICE 2,039,555

PROCESS FOR FORMING TETRATHIONATE SOLUTIONS

Ludwig Rosenstein, San Francisco, Calif.

No Drawing. Application October 25, 1930, Serial No. 491,327

9 Claims. (Cl. 204—9)

This application is a continuation-in-part of my application, Serial No. 293,311, filed July 16, 1928.

This invention relates generally to processes for effecting removal of hydrogen sulfide and related sulfur compounds such as mercaptans from various substances. It has particular application for the removal of hydrogen sulfide and mercaptans from petroleum products which, as is well known, are mixtures of hydrocarbons.

In general it is an object of my invention to improve processes which utilize certain solutions in the treatment of substances for the removal of hydrogen sulfide and mercaptans. In such processes intimate contact between the treating solution and the substance being treated results in the formation of sulfur compounds which are removed from the substance being treated together with the alkaline solution. If the solution is to be re-used, it must be regenerated to free the solution of sulfur compounds such as soluble sulfides. It is characteristic of the present invention that the sulfur compounds in the hydrocarbon mixture are largely transferred to the alkaline solution or are precipitated so that they can be separated with the solution from the substance being treated while the solution is simultaneously or subsequently regenerated or reactivated in a manner to be presently described.

My invention may be outlined briefly as utilizing an alkaline solution of a tetrathionate. I prefer to modify this solution by the addition of buffer salt mixtures to affect the hydroxide ion concentration whereby the solution is kept alkaline. Upon contacting this solution with the substance as a hydrocarbon mixture from which the sulfur compounds are to be removed, such as a petroleum product, elementary sulfur is immediately precipitated from the hydrogen sulfide present while the mercaptans form disulfides. The solution can be simultaneously regenerated or reactivated with the liberation of elementary sulfur or the solution can be removed from contact with the hydrocarbon product before being reactivated or regenerated. In this application I have disclosed the regeneration by means of an electrically effected oxidation as by passing an electric current through the solution.

In practice the tetrathionate which I prefer to employ is a tetrathionate of an alkali metal, although other tetrathionates can be used. I have secured good results by the use of sodium tetrathionate. I have discovered that a tetrathionate such as sodium tetrathionate will not only react with hydrogen sulfide but will also effectively remove mercaptans and that such solutions, after reacting with hydrogen sulfide and mercaptans can be regenerated by electrolytic oxidation. For example starting with a solution of sodium thiosulfate, or some soluble thiosulfate as of an alkali metal, I have found that this solution may be oxidized by electrolysis to form sulfur compounds of higher state of oxidation, such as sodium tetrathionate. When the oxidized solution is brought into contact with the substance being treated for removal of hydrogen sulfide, the sodium tetrathionate reacts rapidly and smoothly with hydrogen sulfide or related sulfur compounds to remove them from the hydrocarbon mixture.

In general, the reactions, although I do not wish to be bound to these, which take place during the process can be represented thus:

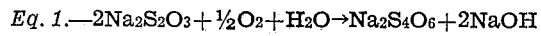

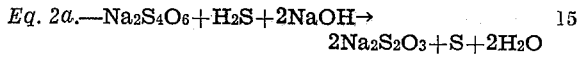

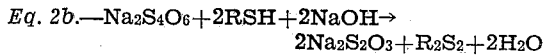

The reforming of the tetrathionate is accomplished by passing an electric current through the solution, the following reactions occuring, I believe, although I do not wish to be bound to this, respectively at the cathode and the anode:

$Eq.\ 3.$—$2H_2O + 2(-) =$
    $2OH^- + H_2$ (cathode reaction)

$Eq.\ 4.$—$2S_2O_3^- + 2(+) = S_4O_6^-$ (anode reaction)

The regeneration of the solution electrolytically can also be considered as taking place according to the following reactions:

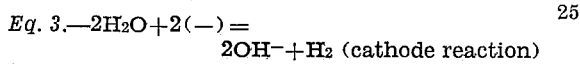

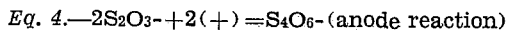

$Eq.\ 7.$—$2NaOH + H^+ \rightarrow 2Na^+ + H_2O$

This regeneration can be termed an indirect one, the oxidation occurring only as a result of the electrolytically gained oxygen. In any event, the passage of the current through the solution serves to effect the regeneration of the tetrathionate.

It will be noted from the above equations that sodium hydroxide (NaOH) is one of the products produced upon oxidizing the sodium thiosulfate. I have discovered that sodium tetrathionate is very unstable in the presence of a strong alkali or in a solution in which the hydroxide ion concentration is above a certain value as for example above $10^{-3}$ molal $OH^-$ ion. I have found however that the hydroxide ion concentration may be kept below this value and thereby the sodium tetrathionate solution made stable by using certain buffer salts or salt mixtures. These buffer salts serve to react with the sodium hydroxide. For example for this purpose I prefer to employ sodium bicarbonate (NaHCO₃) which reacts with the sodium hydroxide as follows:

In addition to the use of sodium bicarbonate and carbonate, other buffer salts or buffer salt mixtures may be employed such as the acid sodium phosphates ($Na_2HPO_4$) and ($NaH_2PO_4$). As indicated by the above Equation 3, these buffer salts or buffer salt mixtures when added to my solution serve to react with the alkali produced and thereby keep the hydroxide ion concentration below a value above which the tetrathionate would become unstable.

It will be obvious to those skilled in the art, that since the process is conducted in an alkaline solution, the concentration of $OH^-$ ion does not decrease below $10^{-7}$ molal, and that therefore the operable limits of $OH^-$ ion concentration are between concentrations of approximately $10^{-3}$ and $10^{-7}$ molal.

After the substance to be treated has been contacted with my solution, which it will be presumed is a solution of sodium tetrathionate and one or more buffer salts, elementary sulfur (S) immediately precipitated as indicated in Equation 2a and the tetrathionate is reduced to thiosulfate. The mercaptans are converted into oil soluble disulfides which, if the oil phase has been substantially removed, can be separated from the solution.

Although it is to be understood that the invention is not limited to the following specific example, for completeness it may be explained that the process can be carried out as follows: A solution containing 18 grams per liter of sodium thiosulfate and 28 grams per liter of sodium bicarbonate is subject to the action of an electric current passing between suitable electrodes in a suitable apparatus. I have found that a nickel anode is satisfactory and therefore prefer one of this metal although any other relatively unoxidizable material as platinum can be used. The passage of the current is continued until that amount of sodium tetrathionate has been formed sufficient to react with the hydrogen sulfide and mercaptans to be present in the next stage of the process. The electrolytic generation of tetrathionate is very successful, can be readily controlled and very high tetrathionate concentrations can be secured.

The solution is then brought into intimate contact with the gas or liquid or other substance containing the hydrogen sulfide and mercaptans, as for example a petroleum product, whereby the sulfide is absorbed with the immediate formation of sulfur from hydrogen sulfide. The solution, which is now free or contains a greatly reduced amount of tetrathionate, or which may even contain traces of sulfide, is now separated from the product and returned to the beginning of the cycle where the regeneration of the solution is effected.

The process can also be conducted continuously by passing the current between suitable electrodes while bringing the hydrocarbon product into contact with the solution of tetrathionate, the disulfides passing out in the oil phase. This is not undesirable since the product is sweet to the doctor test even though the disulfides are present and the sulfur content is practically the same.

The process has given good results and is particularly adapted for the removal of mercaptans and hydrogen sulfide from petroleum products. As is well known certain petroleum products, particularly those resulting from the oil cracking process, may have a relatively high percentage of hydrogen sulfide which must be removed in order to render such products marketable. Not only is the process highly effective in the removal of such sulfides, but the removal is effected without injury to the petroleum product. The product being treated may be either in the gaseous or liquid state.

Although in the above example I have indicated that the process proceeds by certain steps, these steps need not be clearly defined in practice since the process operates advantageously when the removal of the sulfur compounds and the regeneration of the tetrathionate proceeds practically simultaneously. Thus the process can be operated continuously by introducing a sulfur compound containing hydrocarbon mixture into contact with the solution while passing the electric current through the whole mass. The liberated sulfur and refined hydrocarbon mixture can be drawn off continuously and fresh mixture continuously admitted.

I claim:

1. A process of forming a tetrathionate solution comprising electrolytically oxidizing an alkaline thiosulphate solution, the solution being buffered with a compound capable of reacting with the alkali produced to maintain a substantially constant hydrogen ion concentration.

2. A process of forming a tetrathionate solution comprising electrolytically oxidizing an alkaline thiosulphate solution in the presence of a salt capable of reacting with the alkali produced.

3. A process of forming a tetrathionate solution comprising electrolytically oxidizing a solution of an alkali metal thiosulphate in the presence of a compound capable of reacting with the alkali produced.

4. A process of forming a tetrathionate solution comprising electrolytically oxidizing an alkaline thiosulphate solution in the presence of a compound capable of reacting with the alkali produced.

5. A process of forming a tetrathionate solution comprising electrolytically oxidizing a solution of sodium thiosulphate in the presence of a compound capable of reacting with the alkali produced.

6. A process of forming a tetrathionate solution comprising electrolytically oxidizing a thiosulphate solution, the solution being buffered with a compound capable of reacting with the alkali produced to maintain the solution alkaline at a substantially constant hydroxyl ion concentration.

7. A process of forming a tetrathionate solution comprising electrolytically oxidizing a thiosulphate solution, the solution being buffered with a compound capable of reacting with the alkali produced to maintain the hydroxyl ion concentration therein between the limits $10^{-3}$ and $10^{-7}$ molal.

8. A process of forming a tetrathionate solution comprising electrolytically oxidizing a thiosulphate solution, the solution being buffered with a soluble bicarbonate which reacts with the hydroxyl ions produced to maintain the solution alkaline at a substantially constant hydroxyl ion concentration.

9. A process of forming a tetrathionate solution which comprises electrolytically oxidizing a solution of sodium thiosulphate, the solution being buffered with sodium bicarbonate which reacts with the hydroxyl ions formed to maintain the solution alkaline at a substantially constant hydroxyl ion concentration.

LUDWIG ROSENSTEIN.